Figure 1:
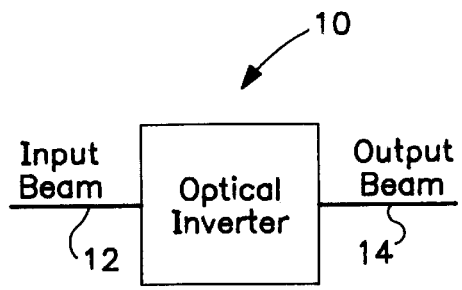

United States Patent

Fields et al.

[11] Patent Number: 6,035,079
[45] Date of Patent: Mar. 7, 2000

[54] SATURABLE ABSORBER BASED OPTICAL INVERTER

[75] Inventors: Richard A. Fields, Redondo Beach; David L. Rollins, Hawthorne; Stephen R. Perkins; Eric L. Upton, both of Redondo Beach; Elizabeth T. Kunkee, Manhattan Beach; Lawrence J. Lembo; Juan C. Carillo, Jr., both of Torrance; Mark Kintis, Manhattan Beach, all of Calif.

[73] Assignee: TRW Inc., Redondo Beach, Calif.

[21] Appl. No.: 09/133,032

[22] Filed: Aug. 11, 1998

[51] Int. Cl.[7] ................................. G02B 6/26
[52] U.S. Cl. ............................. 385/19; 359/204
[58] Field of Search ................ 385/16–19, 24, 385/27, 31, 39; 359/204, 495, 629, 664, 192; 372/24, 6

[56] References Cited

U.S. PATENT DOCUMENTS

| | | | |
|---|---|---|---|
| 4,044,247 | 8/1977 | Brown, Jr. | 359/192 |
| 4,093,354 | 6/1978 | Fletcher et al. | 359/633 |
| 5,155,780 | 10/1992 | Zirngibl . | |
| 5,283,799 | 2/1994 | Jacquet et al. . | |
| 5,303,256 | 4/1994 | Sumida . | |
| 5,315,573 | 5/1994 | Nakao et al. . | |
| 5,325,381 | 6/1994 | Paoli | 372/24 |
| 5,391,329 | 2/1995 | Dougherty et al. . | |
| 5,939,709 | 8/1999 | Ghislain et al. | 359/664 |

*Primary Examiner*—Akm E. Ullah
*Attorney, Agent, or Firm*—Michael S. Yatsko

[57] ABSTRACT

An optical inverter (10) that uses a saturable absorber (28) to distinguish between a logical one and a logical zero. A low power laser (18) generates an optical beam that is split into a first beam that propagates among a first beam path (24) and a second beam that propagates along a second beam path (26). The saturable absorber (28) is an optical switch that is positioned in the first beam path (24), and is switched from an opaque mode to a transparent mode when it receives an optical input signal. The first beam and the second beam are recombined as an optical output beam in an optical combiner (30). The first beam path (24) and the second beam path (26) have a length relative to each other such that the first and second beams are 180° out of phase when they reach the optical combiner (30). Therefore, if the saturable absorber (28) is switched to the transparent mode, the first and second beams combine destructively and the optical output beam is dark, or a logical zero. When the saturable absorber (28) is in the opaque mode, the first beam is blocked so that the optical output beam is the second beam, providing a logical one. A second saturable absorber (34) can be provided to receive the optical output beam from the combiner (30) to absorb residual light when the output beam is dark. Additionally, an optical amplifier (36) can be provided to receive the optical output beam from the combiner (30) to amplify the optical output beam to a consistent, predetermined output level.

20 Claims, 1 Drawing Sheet

SATURABLE ABSORBER BASED OPTICAL INVERTER

BACKGROUND OF THE INVENTION

1. Field of the Invention

This invention relates generally to an optical inverter and, more specifically, to an optical inverter that incorporates a saturable absorber that receives an optical input signal to switch the absorber from an opaque mode to a transparent mode to distinguish between a logical one and a logical zero output.

2. Discussion of the Related Art

The art of digital logic systems consistently requires the need for greater processing speeds, increased channel bandwidths, and improved transmission reliability for information processing and transmission fields. Because of this continued need for improved system performance, the art is moving towards an increased focus on the optical domain. Digital logic systems typically incorporate a plurality of inverters. Inverters are important in digital systems for many reasons, such as the application of DeMorgan's theorem. DeMorgan's theorem allows the combination of only AND gates and inverters, or a combination of only OR gates and inverters, to form a complete gate set. Also, optical inverters are a vital component of optical analog-to-digital converters. An optical analog-to-digital converter is disclosed in U.S. patent application Ser. No. (Attorney Docket No. 12-0854), assigned to the assignee of this application.

Various types of optical inverters are known in the art. One optical inverter known in the art is referred to as a semiconductor optical amplifier (SOA) inverter. The SOA inverter is a saturable optical amplifier that includes a first optical input having a first wavelength, a second optical input having a second wavelength and an optical output that is a combination of the first and second inputs. The first input goes high and low as a digital high and a digital low, and the output conversely goes low and high as an inversion of the first input. The second input is maintained high. When the first input is low or zero, the output is simply the second input, thus representing a high or logical one. When the first input goes high, the intensity of this first input is great enough to saturate the SOA. As a result the amount of light intensity in the output from the second input is reduced. The output beam is then passed through a filter which removes the wavelength of the first input, leaving only the second input. This filtered output will then appear to go down when the first input goes high and come back up again when the first input goes low.

Because the main use of the SOA is a wavelength conversion device for use in wavelength division multiplexing technology, it is limited in its ability to be used as an inverter. Further, the SOA is an active device that is fairly complex and is generally not efficient as an optical inverter. What is needed is an optical inverter that is simptler and more effective than those optical inverters known in the art It is therefore an object of the present invention to provide such an inverter.

SUMMARY OF THE INVENTION

In accordance with the teachings of the present invention, an optical inverter is disclosed that uses a saturable absorber to distinguish between a logical one and a logical zero. A laser generates an optical beam that is split into a first beam that propagates along a first beam path and a second beam that propagates along a second beam path. The first beam and the second beam are then recombined as an optical output beam in an optical combiner. The first beam path and the second beam path have a length relative to each other such that the first and second beams are 180° out of phase when they reach the optical combiner. The saturable absorber acts as an optical switch, and is positioned in the first beam path. The saturable absorber receives an optical input signal that causes the absorber to switch from an opaque mode to a transparent mode to allow the first beam to pass through the absorber. Therefore, if the saturable absorber is switched to the transparent mode, the first and second beams combine destructively and the optical output beam is dark, or a logical zero. When the optical input signal is not applied to the saturable absorber, the absorber is in the opaque mode, and the first beam is blocked so that the optical output beam is the second beam, providing a logical one.

A second saturable absorber can be provided to receive the optical output beam from the combiner to clean up residual light when the output beam is dark. Additionally, an optical amplifier can be provided to receive the optical output beam from the combiner to amplify the optical output beam to a consistent, predetermined level.

Additional objects, advantages and features of the present invention will become apparent from the following description and appended claims, taken in conjunction with the accompanying drawings.

BRIEF DESCRIPTION OF THE INVENTION

Figure 2:
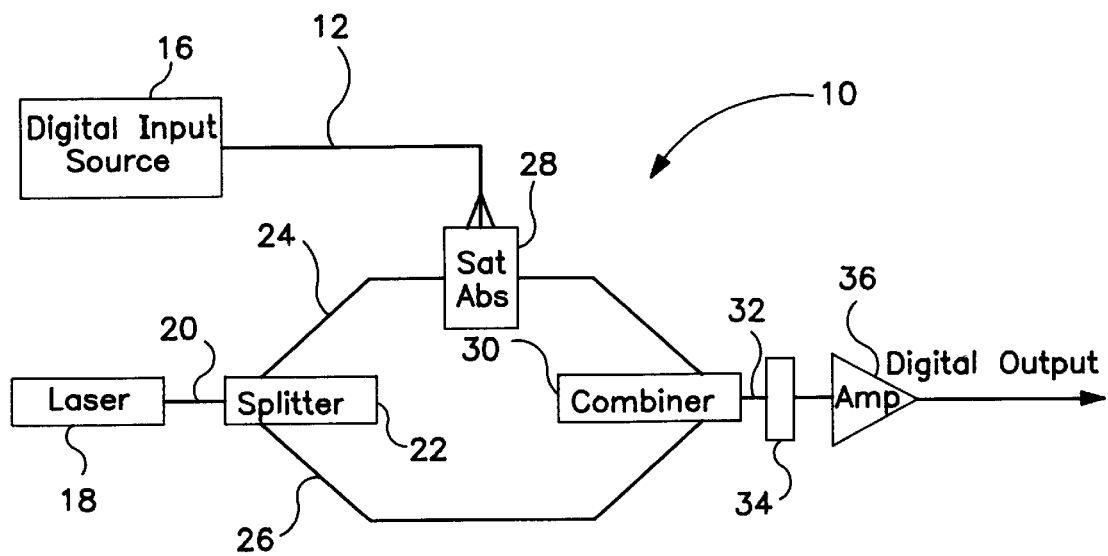

FIG. 1 is a plan view of an optical inverter according to an embodiment of the present invention; and FIG. 2 is schematic diagram of the optical inverter shown in FIG. 1.

DETAILED DISCUSSION OF THE PREFERRED EMBODIMENTS

The following description of the preferred embodiments directed to an optical inverter incorporating a saturable absorber and fiber optic cables as optical waveguides is merely exemplary in nature, and is in no way intended to limit the invention or its applications or uses.

As mentioned above, there are many digital applications that require an optical inverter. FIG. 1 shows a plan view of an optical inverter 10 suitable for a typical optical digital logic application, according to an embodiment of the present invention. The optical inverter 10 receives an optical input beam of a predetermined intensity on an input fiber optic cable 12, or some other suitable optical medium, and outputs an optical output beam on an output fiber optic cable 14, or some other suitable optical medium. The optical inverter 10 acts as an inverter in that when the optical input beam on the cable 12 is applied to the optical inverter 10, the optical output beam on the cable 14 is dark, or at a predetermined low optical intensity level, and represents a logical zero. Likewise, when the optical input beam on the cable 12 is off, or at a low intensity level, a predetermined intensity optical output beam is provided on the output cable 14, and represents a logical one. Thus, the optical output beam of the optical inverter 10 will be a high or low intensity optical output beam, depending on the optical input beam.

FIG. 2 shows a schematic diagram of the architecture of the optical inverter 10, according to one embodiment of the invention. An optical digital input source 16 provides the optical input beam propagating down the cable 12. The digital input source 16 can be any suitable optical source, such as a semiconductor laser, that generates an applicable optical beam on the cable 12 having a certain beam intensity, depending on the particular application that the inverter 10 is being used for. The optical inverter 10 further includes a laser 18 that generates a laser beam on a fiber optic cable 20. The optical input beam on the cable 12 and the laser beam on the cable 20 can be either a pulsed beam or a continuous wave (CW) beam that is turned on and off at the appropriate time for different applications. A pulsed beam could be applicable if the particular system the inverter 10 was being used in incorporated beam pulses. According to an embodiment of the present invention, the input beam and the laser beam are either both pulsed beams that are timed together or continuous beams.

The laser beam on the cable 20 is sent to a beam splitter 22. The beam splitter 22 splits the laser beam into a first laser beam transmitted along a fiber optic cable 24 and a second laser beam transmitted along a fiber optic cable 26. The beam splitter 22 can be any suitable beam splitter or optical coupler known in the art, such as a fiber optic 3 dB coupler, or a suitable monolithically integrated semiconductor chip or a glass waveguide chip. The fiber optical cables can be any suitable cables for the purposes described herein.

The first laser beam propagating along the fiber optic cable 24 is sent to and impinges upon a saturable absorber 28 that acts as an optical switch. The saturable absorber 28 is either in a transparent mode that allows the first light beam on the cable 24 to pass through the absorber 28, or an opaque mode that blocks the first laser beam from continued propagation along the cable 24. The saturable absorber 28, which at rest is in the opaque mode, is switched from the opaque mode to the transparent mode when it receives a high enough light intensity. Therefore, the intensity of the first laser beam propagating along the cable 24 is necessarily low enough to prevent the absorber 28 from switching to the transparent mode by the intensity of the first laser beam alone. The optical input beam on the fiber 12 also impinges upon the absorber 28, and combines with the light intensity from the first laser beam to cause the absorber 28 to switch to the transparent mode to allow the first laser beam to continue to propagate along the cable 24. In one embodiment, the input beam on the cable 12 impinges upon the absorber 28 at substantially 90° relative to the direction that the first laser beam minges upon the absorber 28 so that the input optical beam does not get coupled into the first laser path 24 and add unwanted light intensity to the first laser beam. Therefore, if the optical input beam is off, or between pulses, the saturable absorber 28 is in the opaque mode, and the first laser beam on the cable 24 is blocked. If both the optical input beam and the first laser beam impinge upon the absorber 28, the absorber 28 will change to the transparent mode and the first laser beam is allowed to continue along the cable 24.

The saturable absorber 28 can be any known absorber suitable for the purposes of the present invention as described herein. For example, the saturable absorber 28 can be a liquid cell including a suitable dye. Additionally, the saturable absorber 28 can be a semiconductor saturable absorber, well known to those skilled in the art, that includes multiple quantum wells. A saturable absorber of this type used as described herein has well known material properties and phenomena used in the art to block semiconductor laser lights. One such saturable absorber is disclosed in U.S. Pat. No. 5,303,256. Alternately, the absorber can be any related device that performs the function as described above, such as electro-absorption modulator, known to those skilled in the art. Also, the absorber 28 can be an optical device that is transparent in its normal mode, and is switched to an opaque mode by an input signal.

The first laser beam on the cable 24 and the second laser beam on the cable 26 are applied to an optical combiner 30, and are outputted from the combiner 30 as a single combined optical output beam on a fiber optical cable 32. The combiner 30 can also be any suitable fiber optic coupler, such as a fiber optic 3 dB coupler or a semiconductor waveguide chip. Because the wavelength of the first and second laser beams are the same, the combination of the first and second laser beams create an interference pattern within the combiner 30 based on the relative distance that the first and second laser beams travel down the cables 24 and 26. By making the distance that the first and second laser beams travel down the cables 24 and 26 a half of a wavelength different, or 180° out of phase, the interference pattern between the first and second laser beams will be destructive, and the intensity of the optical beam out of the cable 32 would be substantially zero or dark, representing a logical zero. As long as the path length of the first and second laser beams from the splitter 22 to the combiner 30 is at or near a distance that causes the first and second laser beams to be 180° out of phase with each other, the output laser beam on the cable 32 will be substantially dark. If the saturable absorber 28 is in the opaque mode, as discussed above, the first laser beam is not available to be combined with the second laser beam, and thus the output laser beam from the combiner 30 on the cable 32 is the second laser beam propagating on the cable 26, representing a logical one.

Because the destructive interference between the first and second laser beams will not provide perfect cancellation because of the inherent inaccuracies of the optical components and noise in the system, a second saturable absorber 34 is provided as a threshold device to eliminate the residual light on the output cable 32 when the saturable absorber 28 is in the transparent mode. The absorber 34 acts as a threshold device in that if the intensity of the output beam on the cable 32 is below a certain intensity, the absorber 34 will block the residual light, but if the intensity of the output beam on the cable 32 is above a predetermined intensity, such as the intensity of the second laser beam when the saturable absorber is in the opaque mode, the absorber 34 will allow the beam to pass.

An optical amplifier 36 is provided to amplify the output beam to a predetermined intensity when the saturable absorber 28 is in the opaque mode. The optical amplifier 36 can be any suitable amplifier known in the art that performs this function, such as an SOA or an erbium-doped fiber amplifier, EDFA. Therefore, the output of the optical amplifier 36 is either a near zero intensity digital output optical beam when the optical digital input on the input cable 12 is "high" or at a certain optical intensity to represent a logical zero, or the output optical beam is a predetermined intensity optical digital output beam when the input optical beam on the cable 12 is "low" or substantially zero to represent a logical one.

The optical inverter 10 described above has a particular application in a monolithic semiconductor digital architecture. In this type of architecture, the various components discussed above can be semiconductor components suitable for this type of configuration. The discussion above describes a single laser beam output from the laser 18 being split into first and second laser beams propagating along first and second optical fibers. It may be possible to provide two laser beam sources and eliminate the need for the splitter 22. These two lasers, however, would have to be extremely closely matched in frequency, phase and intensity.

Additionally, the various optical beams can be transported down other types of medium, including air or semiconductor waveguides, instead of using the fiber optic cables.

The foregoing discussion discloses and describes merely exemplary embodiments of the present invention. One skilled in the art will readily recognize from such discussion, and from the accompanying drawings and claims, that various changes, modifications and variations to be made therein without departing from the spirit and scope of the invention as defined in the following claims.

What is claimed is:

1. An optical inverter comprising:
   an optical beam source, said optical beam source generating an optical beam;
   an optical beam splitter receiving the optical beam, said beam splitter splitting the beam into a first split optical beam propagating along a first beam path and a second split optical beam propagating along a second beam path;
   an optical switch positioned in the first beam path, said optical switch receiving an input signal that switches the optical switch between an opaque mode that prevents the first split beam from passing through the switch and a transparent mode that allows the first split beam to pass through the switch; and
   an optical beam combiner receiving and combining the first split beam and the second split beam into an optical output beam, wherein the distance of the first beam path and the second beam path causes the first and second split beams to be 180° out of phase with each other at the beam combiner so that if the optical switch is switched to the transparent mode, the first and second split beams combine destructively and the output beam is substantially dark, and if the optical switch is switched to the opaque mode the first split beam is blocked and the output beam is the second split beam.

2. The inverter according to claim 1 wherein the optical switch is a saturable absorber and the input signal is an optical input signal, said absorber being switched to the transparent mode when it receives the optical input signal and the absorber being in the opaque mode when the optical input signal is off.

3. The inverter according to claim 2 wherein the optical input signal impinges the absorber at an angle substantially at 90° relative to the angle that the first split beam impinges the absorber.

4. The inverter according to claim 1 wherein the optical beam source is a low power laser.

5. The inverter according to claim 4 wherein the optical beam is selected from the group consisting of a pulsed optical beam and a continuous optical beam.

6. The inverter according to claim 1 further comprising a threshold device receiving the optical output beam, said threshold device eliminating residual light due to imperfect cancellation of the first and second split beams in the combiner when the optical switch is in the transparent mode and allowing the second split beam to pass when the optical switch is in the opaque mode.

7. The inverter according to claim 6 wherein the threshold device is a saturable absorber.

8. The inverter according to claim 1 further comprising an optical amplifier, said amplifier receiving the optical output beam and amplifying the output beam to a predetermined optical output level.

9. The inverter according to claim 1 wherein the first and second optical beam paths are defined by first and second optical fibers.

10. The inverter according to claim 1 wherein the inverter is part of an optical logic system.

11. The inverter according to claim 10 wherein the optical logic system is selected from the group consisting of optical computers and optical analog-to-digital converters.

12. An optical inverter for use in connection with an optical logic device, said inverter comprising:
    a laser, said laser generating an optical beam;
    an optical beam splitter receiving the optical beam, said beam splitter splitting the beam into a first split optical beam propagating along a first optical beam path and a second split optical beam propagating along a second optical beam path;
    a first saturable absorber positioned in the first beam path and receiving an optical input signal, said optical input signal being selectively activated to cause the saturable absorber to become transparent to allow the first split beam to pass through the first absorber;
    an optical beam combiner receiving the first and second split beams, said optical combiner combining the first split beam and the second split beam into an optical output beam, wherein the distance of the first beam path and the second beam path relative to each other causes the first and second split beams to be 180° out of phase with each other at the beam combiner so that if the first saturable absorber allows the first split beam to pass, the first and second split beams combine destructively and the optical output beam is substantially dark, and if the saturable absorber is opaque, the first split beam is blocked and the optical output beam is the second split beam; and
    a threshold device receiving the optical output beam, said threshold device eliminating residual light due to imperfect cancellation of the first and second split beams in the combiner when the saturable absorber allows the first split beam to pass and allowing the second split beam to pass when the first saturable absorber blocks the first split beam.

13. The inverter according to claim 12 wherein the optical input signal impinges the first absorber at an angle substantially at 90° relative to the angle that the first split beam impinges the first absorber.

14. The inverter according to claim 12 wherein the optical beam is selected from the group consisting of a pulsed optical beam and a continuous optical beam.

15. The inverter according to claim 12 wherein the threshold device is a second saturable absorber.

16. The inverter according to claim 12 further comprising an optical amplifier, said amplifier receiving the output beam and amplifying the output beam to a predetermined optical output level.

17. The inverter according to claim 12 wherein the first and second optical beam paths are defined by first and second optical fibers.

18. The inverter according to claim 12 wherein the optical logic device is selected from the group consisting of optical computers and optical analog-to-digital converters.

19. An optical inverter comprising:
    a first optical system including a first optical beam propagating along a first optical path, said first optical system further including an optical switch that switches between a first optical mode that allows the first optical beam to propagate through the switch and a second optical mode that prevents the first optical beam from propagating through the switch;
    a second optical system including a second optical beam propagating along a second optical path; and an optical beam combiner receiving the first and second optical beams, said optical beam combiner combining the first optical beam and the second optical beam into an optical output beam, wherein the distance of the first beam path and the second beam path relative to each other causes the first and second optical beams to be 180° out of phase with each other at the beam combiner so that if the optical switch is in the first optical mode and allows the first optical beam to pass, the first and second optical beams combine destructively and the optical output beam is substantially dark, and if the optical switch is in the second optical mode and blocks the first optical beam, the optical output beam is the second optical beam.

20. The inverter according to claim 19 wherein the optical switch is a saturable absorber, said saturable absorber receiving an optical input signal, said absorber being in the first optical mode when it receives the optical input signal and the absorber being in the second optical mode when the optical input signal is off.

* * * * *